L. E. WEINMANN.
SOFA BED.
APPLICATION FILED MAY 19, 1915.
1,265,012.
Patented May 7, 1918.
6 SHEETS—SHEET 5.
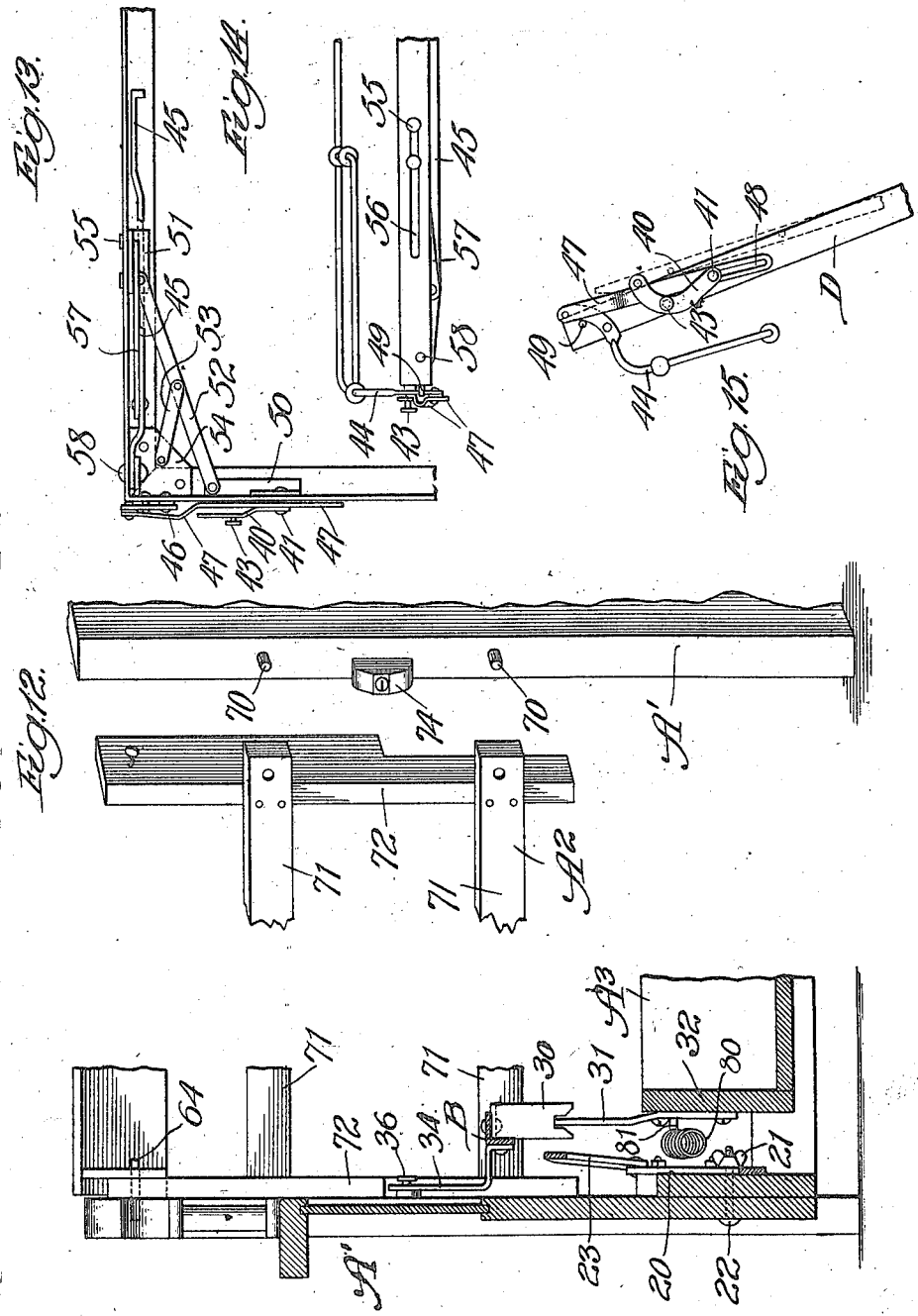
Witnesses:
Inventor.
Louis E. Weinmann,

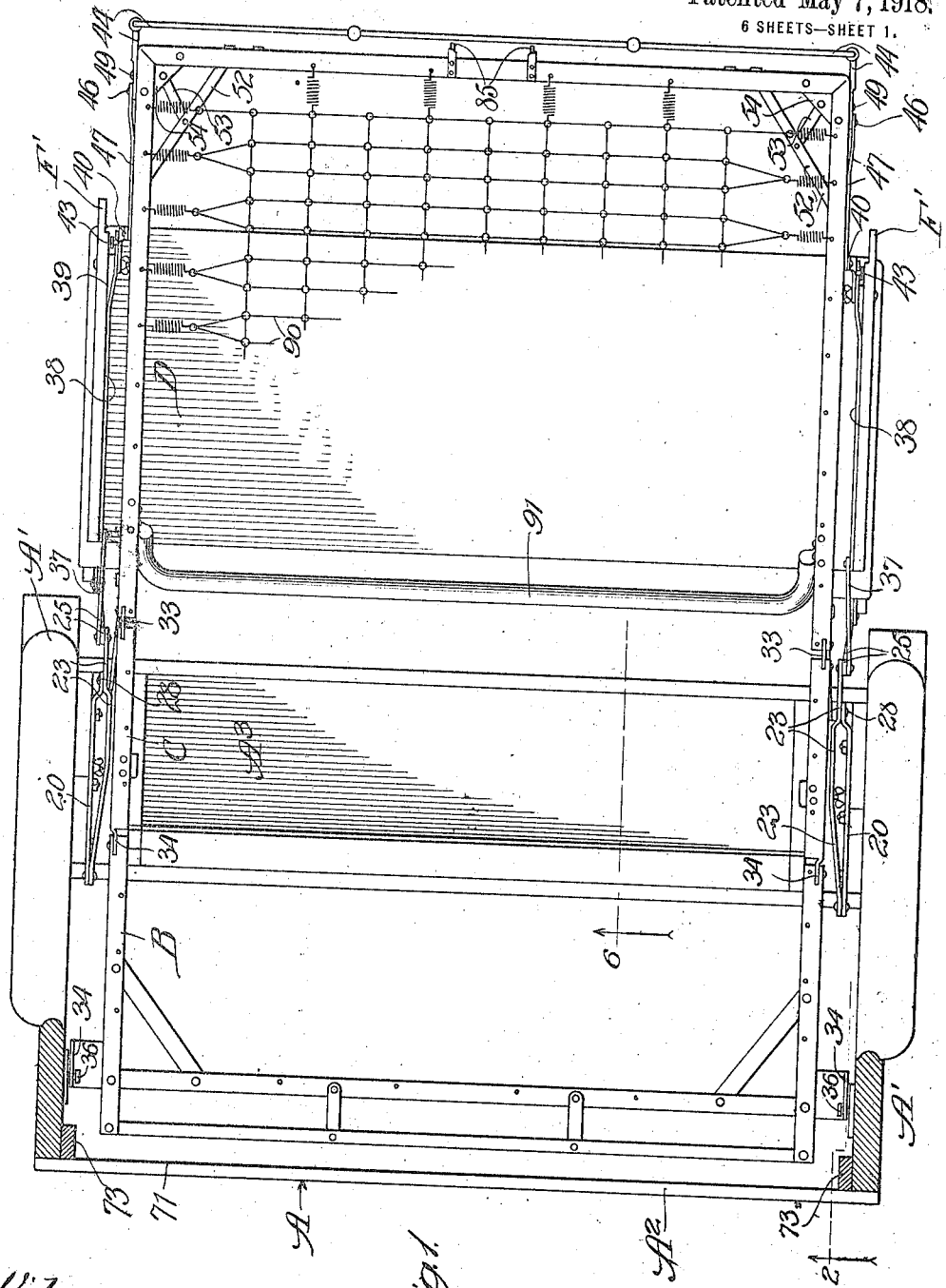

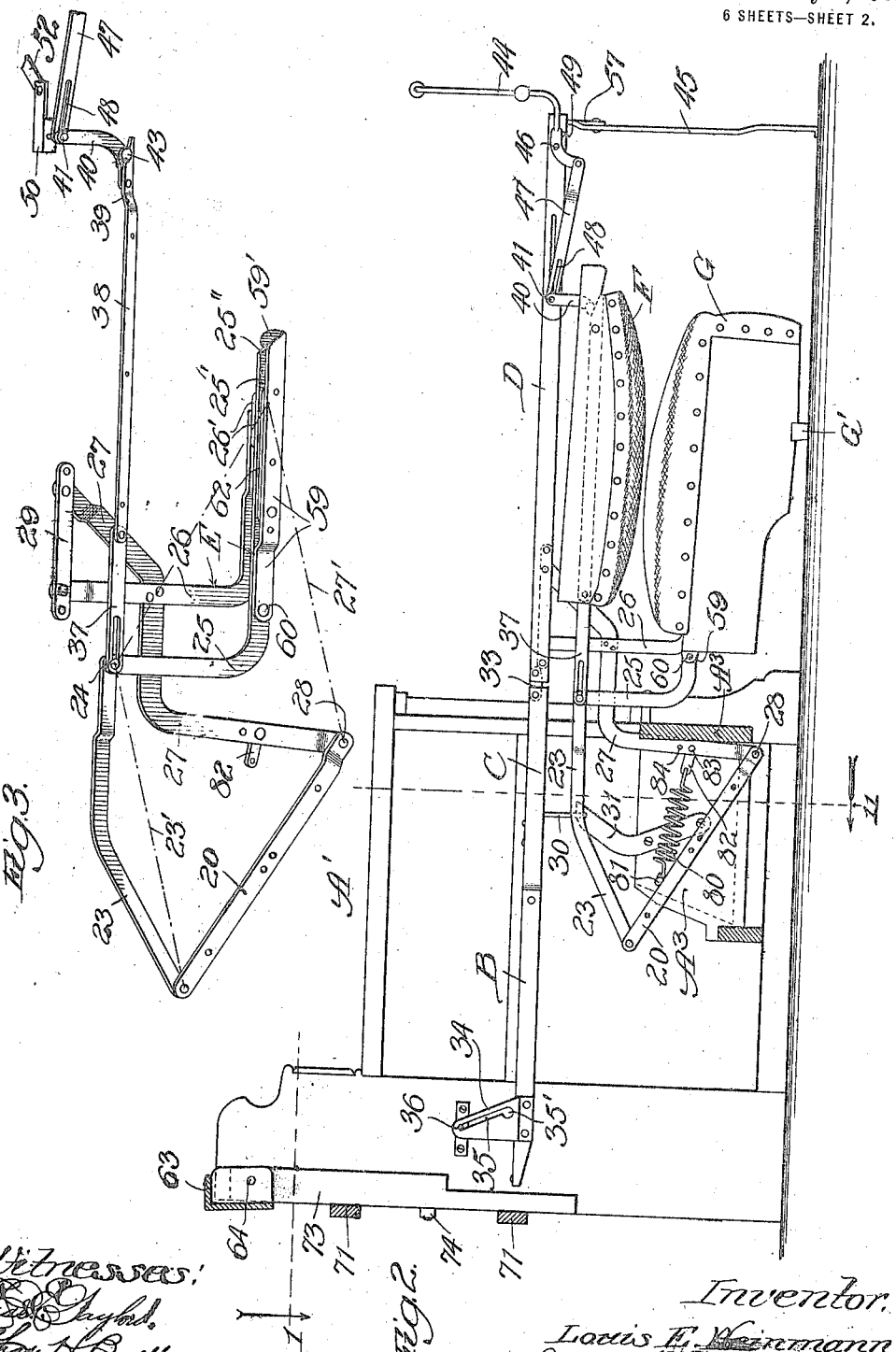

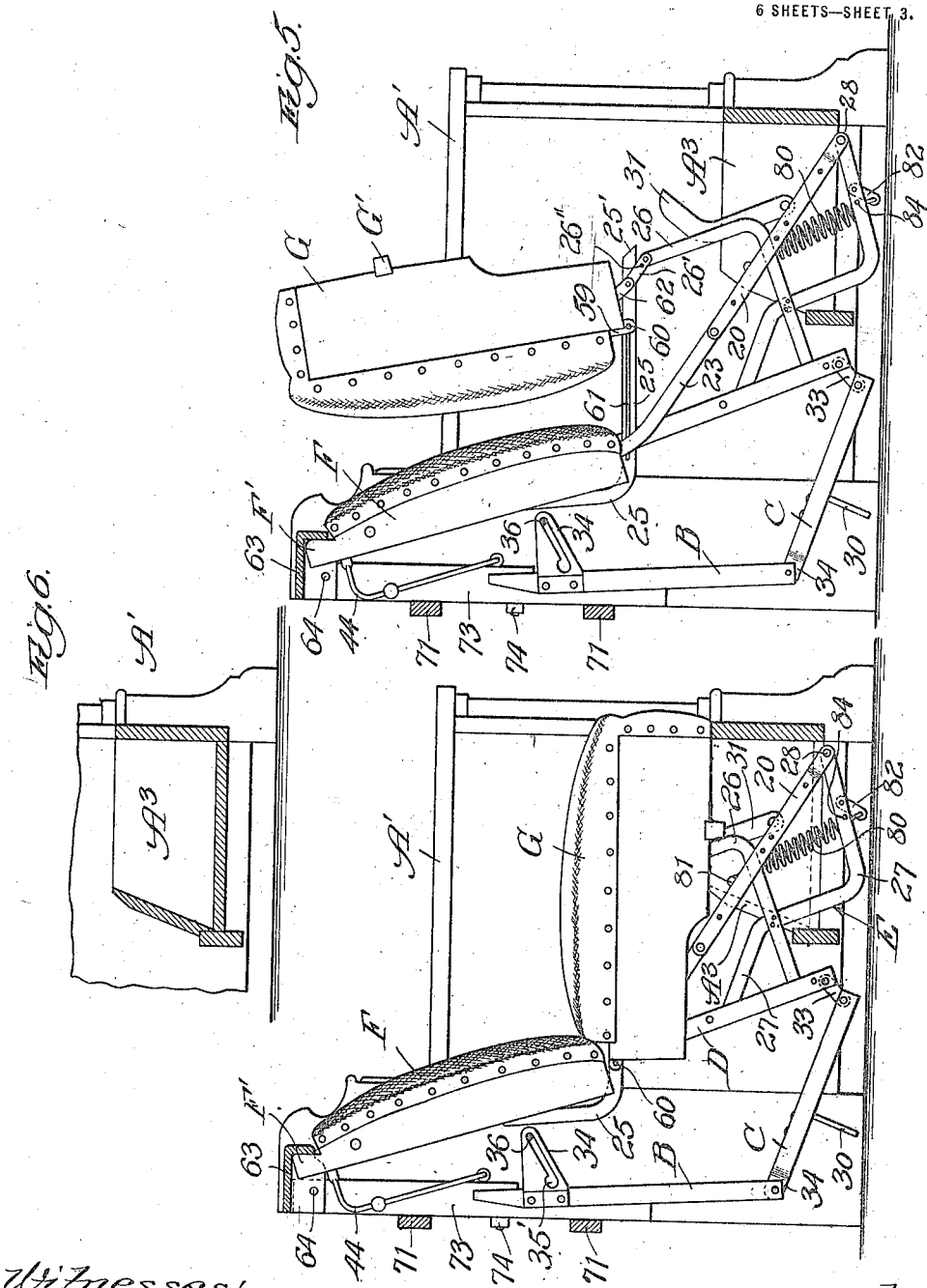

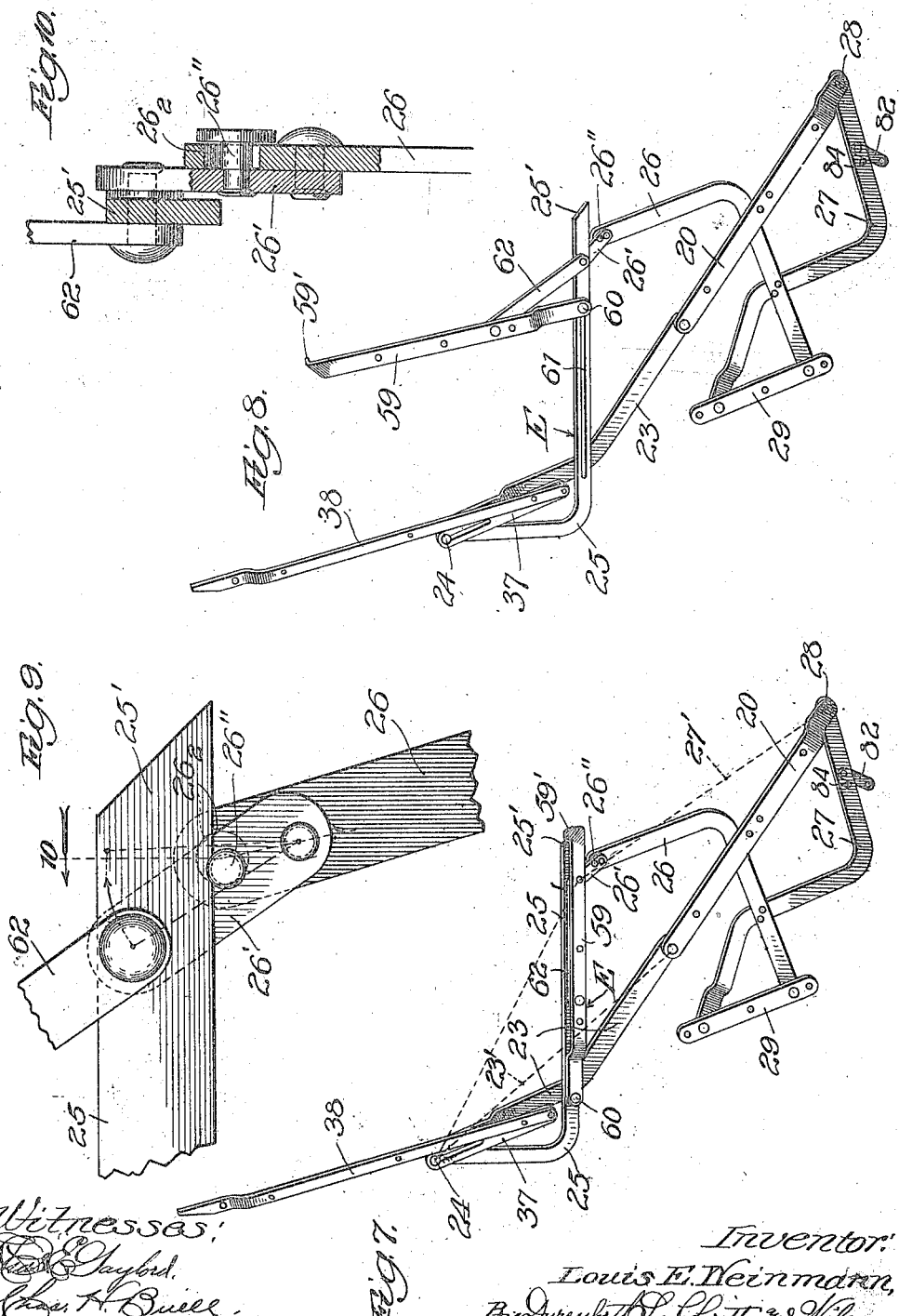

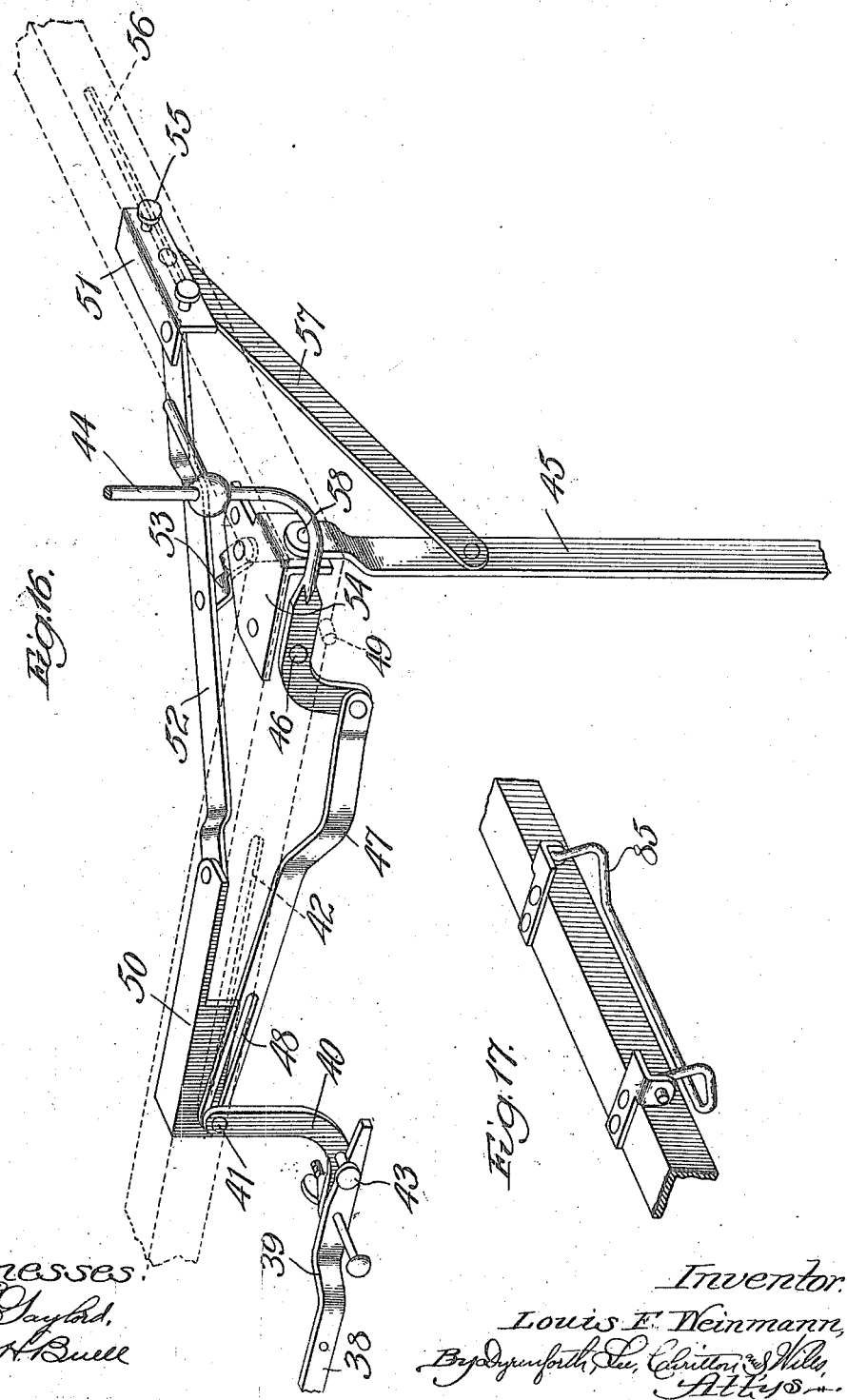

UNITED STATES PATENT OFFICE.

LOUIS E. WEINMANN, OF CHICAGO, ILLINOIS, ASSIGNOR, BY DIRECT AND MESNE ASSIGNMENTS, OF ONE-THIRD TO GOLD FURNITURE COMPANY, A CORPORATION OF ILLINOIS, ONE-THIRD TO KROEHLER MANUFACTURING COMPANY, A CORPORATION OF ILLINOIS, AND ONE-THIRD TO PULLMAN COACH COMPANY, A CORPORATION OF ILLINOIS.

SOFA-BED.

1,265,012.      Specification of Letters Patent.      Patented May 7, 1918.

Application filed May 19, 1915. Serial No. 29,090.

*To all whom it may concern:*

Be it known that I, LOUIS E. WEINMANN, a subject of the Emperor of Germany, residing at 4857 Michigan avenue, Chicago, in the county of Cook and State of Illinois, have invented a new and useful Improvement in Sofa-Beds, of which the following is a specification.

My invention relates to improvements in sofa-beds, and more particularly to that type of sofa-bed illustrated in my prior Patent No. 1,120,349, granted to me on December 8, 1914. The particular nature of the improvements with which the present invention is concerned will be more fully brought out in the following detailed description of one specific embodiment of my invention. In this description reference will be had to the accompanying drawings, in which—

Figure 1 is a top plan view of a sofa-bed embodying the invention and shown in the open or extended position, the stationary frame being cut away at the top, as indicated by the line 1 of Fig. 2, to expose the working parts of the bed. Fig. 2 is a side elevation of the bed shown in the position of Fig. 1, the arm-member of the frame being removed, as indicated by the line 2 of Fig. 1, to show the construction more clearly. Fig. 3 is a perspective view of the linkage which supports the bed-sections, the view being taken in the position of the linkage shown in Fig. 2. Fig. 4 is a side elevation of the sofa-bed in a closed position, the side frame-member being removed, as in Fig. 2. Fig. 5 is a view similar to Fig. 4, but showing the sofa-seat member lifted. Fig. 6 is a section through the storage-box of the stationary frame, taken on the line 6 of Fig. 1. Figs. 7 and 8 are perspective views of the bed-supporting linkage in the position it occupies in Figs. 4 and 5, respectively. Fig. 9 is an enlarged detail elevation of the connections between certain portions of the linkage. Fig. 10 is a section on the line 10 of Fig. 9. Fig. 11 is a section on the line 11 of Fig. 2. Fig. 12 is a rear perspective view of the stationary frame, showing the manner of assembling and locking together the parts of the latter. Fig. 13 is a bottom plan view of the outer bed-section, the legs and folding-foot being shown in the closed position. Fig. 14 is an end view of the foot-rail of the bed, the parts being shown in the same position as in Fig. 13. Fig. 15 is a detail side elevation of the side rail at the end of the bed, the parts occupying the position shown in Figs. 13 and 14. Fig. 16 is an enlarged perspective view of one outer corner of the bed and showing the relation of the moving parts, the side rail and the foot-rail being shown in dotted lines; and Fig. 17 is an enlarged perspective view of the central portion of the foot-rail, showing the manner of attaching the handle thereto.

Referring more particularly to the drawings, the sofa-bed of my invention comprises essentially a stationary frame, generally designated by the numeral A, and comprising side or arm-members $A^1$, a back member $A^2$, and a longitudinal front member $A^3$, which is built in the form of an open-top storage compartment. Within this stationary frame A is mounted a bed-bottom which is formed of three hinged sections, a rear section B, which is supported directly upon the stationary frame A, an intermediate section C, which has no direct connection with the frame but is pivoted between the rear section B and an outer or front section D. Between the front section D and the stationary frame there there is mounted, on each side of the bed, a linkage, generally designated by the numeral E and shown in Figs. 3, 7 and 8. (Since the linkages on the two sides of the bed are identical, except, of course, that one is a right-hand and one a left-hand linkage, the description of one of these will be made to suffice for both.) In addition to its function as a carrier for the outer bed-section D, the linkage E supports and controls the movements of a sofa back-member F, and a sofa-seat member G. As shown in Fig. 4 of the drawing, the sofa-seat and back members are designed to fit within the stationary frame and between the arms $A^1$ thereof, and to constitute with the frame, when the bed parts are in the folded position shown in Fig. 4, a conventional davenport, settee, or sofa, of ordinary appearance, the linkage E and the hinged bed-sections B, C, D being housed below the sofa seat-member and behind the sofa back-member in this position of the parts. In the extended position of the bed, as shown in Fig. 2, the sofa-seat and back members have been, by their connection with the linkage E, carried forward to a position beneath the extended outer bed-section and lie in spaced parallel relation between the latter and the floor, the sofa-seat member G being designed in this position of the parts to rest upon the floor and being provided with feet G¹ for this purpose.

By comparison of Figs. 4 and 2, which represent the positions of the parts in the folded and unfolded positions of the bed, respectively, it will be seen that in moving from the folded position to the unfolded position the sofa-seat member G has been carried forwardly and downwardly in positions substantially parallel to one another. This result is accomplished by the use of the linkage generally designated E, which will now be more particularly described.

The stationary member of this linkage is designated 20 and consists of a flat strip, or plate, of metal, which is designed to be fastened in an upwardly and rearwardly-inclined position upon the inside face of the arm or side-member A¹ of the stationary frame, the securing means preferably comprising wing-nuts 21 and bolts 22, as shown in Fig. 11.

To the upper or rear end of the stationary link 20 there is connected a swinging arm 23, which is bent at its middle portion in order to clear the sofa-seat member in the folded position, as shown in Figs. 4 and 7. The outer end of the lever-arm 23 carries, by means of a pivot-bolt 24, a depending angularly-bent link 25, the horizontal arm 25¹ of which extends completely under and supports the sofa-seat member G. To the front end of this arm there is pivoted an angularly-bent member 26, which forms, in effect, a portion of a swinging arm 27 pivoted at 28 to the lower or front end of the stationary linkage member 20. As best shown in Figs. 2 and 3, the arm 27 is bent at right-angles intermediate its length in order to clear the front longitudinal frame-member storage compartment A³, and adjacent its outer end is again bent obliquely upward, its extremity being joined to the upper extremity of the member 26 by a bar 29 which is designed to be secured to and to carry the side rail of the outer bed-section D. Instead of being directly pivoted to the link 25 which carries the sofa-seat member G, the member 26 is in fact provided with a small pivoted end-section 26¹ which carries a rivet 26¹¹ projecting into a relatively large hole 26₂ in the end of the member 26, so that the pivoted end-section 26¹ may have a limited angular movement with relation to the member 26. (See Fig. 9.) These connections between the parts are for the purpose of permitting the link 25, which carries the sofa-seat member G, to drop downwardly a slight distance in the unfolded position of the parts shown in Fig. 2, in order that it may rest upon the floor and clear the sofa-back member F and permit the latter to be spaced away from the bottom of the outer bed-section D. It will thus be seen that, in effect, the linkage E as so far described, constitutes a parallel linkage, the angularly-bent arms 23 and 27, 26 (the two latter members constituting a single arm moving about the pivot 28) being in fact parallel levers, as indicated by the dotted lines 23¹ and 27¹ in Figs. 3 and 7, and the link 25 which carries a sofa-seat member G thus has a substantially parallel motion in going from the folded to the unfolded position of the parts.

As has been pointed out, the swinging arm constituted by the members 26, 27, serves, in addition to its function as a parallel lever for carrying the sofa-seat G, as a carrier for the outer or front bed-section D, which is mounted upon the bar 29 joining the upper ends of the members 26, 27. (See Fig. 3.)

The bed-section D therefore swings in going from the folded to the unfolded position about the point 28, as a pivot, and in the extended position of the parts, as shown in Figs. 2 and 3, the arm 27 constitutes a leg or support for the rear end of the bed-section B. For supporting the intermediate bed-section C in the extended position of the parts, I provide the latter with a pair of depending feet 30 (see Figs. 2 and 11) the bottoms of which are notched to straddle the upper ends of supporting arms 31, which are fastened to the outer faces of the parts 32, which form the end-members of the storage compartment constituted by the longitudinal stationary frame-member A³. As the bed-section C moves from the position shown in Fig. 4 to the position shown in Fig. 2, the notched ends of the feet 30 ride upon the rounded upper ends of the arms 31 and positively raise the intermediate bed-section C into its proper position in the horizontal plane of the front bed-section D. For pivoting the bed-sections C and D together, I provide short pivot links 33, which operate in slots in the flanges of the side rails of the two bed-sections. The rear end of the bed-section C is pivoted directly to the rear bed-section B, the flanges of the side rails of the bed-section C being cut away and the rails in-turned, as shown in Fig. 1 at 34, and pivoted to operate in slots in the flanges of the side rails of the rear bed-section B.

Since the front bed-section D swings about the point 28 as a pivot, and the intermediate bed-section C rigidly connects section D with the section B, it is necessary to provide displaceable connections between the section B and the stationary frame. Such connections are provided in the form of triangular-shaped plates 34 having slots 35 therein, which receive pivot members 36, which are mounted on the arms or sideframes A¹. For convenience in assembling the bed-sections within the stationary frame, the slots 35 have enlarged ends 35¹, which permit of the plates 34 being introduced over the heads of the pivots 36 without removing the latter. In the operation of the bed, that is in moving it from the folded to the unfolded position, or vice versa, the rear bed-section B moves in such a manner as to cause the plates 34 to slide upon the pivots 36, but such sliding movement is less than the length of the slots 35, so that there is no danger of the plates becoming disengaged from the pivots accidentally. In both the completely folded and completely unfolded position of the parts, as shown by Figs. 2 and 4, the pivot-studs 36 lie at the outer ends of the slots 35.

The arm 23 which supports one end of the link 25 has a further function, that is it serves also as a means for carrying and operating the sofa-back F to move the latter from its position embracing the outer bed-section D, as shown in Fig. 4, to a position spaced away from and beneath the latter, as shown in Fig. 2. This is accomplished by means of a link 37 having one end slotted to engage the pivot-stud 24, and the other end pivoted to a strip 38, which is secured to the end frame-member of the sofa back F. As shown in Figs. 7 and 8, the link 37 in the folded position of the parts occupies a position behind the sofa-back member, and by means of its connection with the arm 23 serves to pull the lower end of the sofa-back member upwardly and rearwardly to cause it to occupy the position shown in Fig. 4. As the parts are moved to the open position, shown in Figs. 2 and 3, the pivot-stud 24 moves inwardly in the slot of the link 37, and then on further opening movement again travels to the end of the slot, so that in the completely unfolded position of the parts, as shown in Fig. 2, the link 37 lies in a straight line with the outer end of the arm 23, and in this motion the sofa back member F has been pulled away from the end of the outer bed-section D. The connections between the outer end of the bed-section D and the sofa back member F are best shown by the perspective view, Fig. 16, from which it will be seen that the outer end of the strip 38 is off-set inwardly, as at 39, the off-set end carrying a pivoted angularly bent link 40, the other end of which carries a stud 41 which is adapted to slide within a slot 42 in the side rail of the outer bed-section. In order to limit the swinging movement of the link 40, the latter is provided with a stop-lug or stud 43, which engages the extremities of the strip 38, as shown in Fig. 16. This sliding movement of the sofa-back member F, i. e., its movement away from the end of the bed-section D in the unfolding motion of the parts is made use of to operate the mechanism at the outer end of the bed-section D. This mechanism comprises an automatically-movable L-shaped foot-piece 44 and automatically-movable legs 45. The foot-piece 44 may be conveniently formed of a bent rod, and is pivoted at its ends to the side rails of the bed-section by pivot-bolts 46, these bolts engaging through the angularly-bent ends of the foot-rest. The operating means for the foot-rest 44 comprises a link 47 pivoted to the angularly-bent end of the foot-rest, and having its opposite end slotted, as at 48, and engaging the stud 41. It will be seen that as the sofa-back-member F carrying the strip 38 is moved toward the outer end of the bed-section D, the link 40 will swing about its pivotal connection with the strip 38, and on further movement of the sofa back member the stud 41 will begin to slide outwardly within the slot 42, and in such sliding movement will eventually come to the end of the slot 48, at which time motion will be communicated to the bent end of the foot-piece 44, and the latter will be swung about its pivots 46 to occupy the position shown in Fig. 15. In order to limit the swinging movement of the foot-piece, I may provide stop-studs, or lugs, 49, as shown in Figs. 15 and 16. The sliding movement of the lug 41 is made to operate the folding leg 45 by means of the following connections. As is best shown in Fig. 16 the side rail and end rail of the bed-section D are both of angular cross-section, and within these angular rails there are mounted for sliding movement a pair of plates 50, 51, the former being in the side rail and the latter in the end rail. The plate 50 is secured to the inwardly projecting end of the stud 41 and has pivoted to its outer end a link 52, which joins it with and is pivoted to the sliding member 51. For controlling the movement of the link 52 I may further provide a relatively short lever 53, pivoted at approximately the center of the link 52 at one end, and at the other end to the gusset-plate 54 which joins the rails. The member 51 is confined to its proper path by means of a headed stud 55, which passes through and moves within a slot 56 in the foot-rail. The sliding movement of the member 51 is made to operate the folding leg 45 by means of a connecting link 57, which is pivoted to the leg intermediate the length of the latter, and swings it about a pintle 58. In Figs. 13, 14, and 15, the parts shown in Fig. 16 are represented in the closed or folded position, the leg 45 lying within the angle of the foot-rail and parallel to the latter, and the foot-piece 44 turned downwardly to lie above and spaced away from the outer bed-section.

In order to permit the sofa seat member G to be elevated when the parts are in the folded position, in order that access may be had to the storage compartment A³, I have mounted the sofa-seat member upon a strip 59, which is provided with a stud 60 engaging a slot 61 in the horizontal arm of the link 25, and intermediate the length of the strip 59 I have pivoted thereto the outer end of a link 62, the inner end of which is pivoted to the link 25. By this construction the sofa-seat member may be tilted in the position shown in Fig. 5, the linkage occupying the position shown in Fig. 8 in this tilted position of the sofa seat member. When the sofa-seat member is in its horizontal lowered or normal position, the strip 59 lies parallel to the horizontal end of the arm 25, and the link 62 drops into the same parallel position, the linkage then occupying the position shown in Fig. 7, and in this position of the parts the sofa-seat member is supported by the inturned end $59^1$ of the member 59 which engages the beveled end $25^{11}$ of the arm $25^1$.

For locking the moving parts, that is the bed-sections and the sofa-seat and back members in the closed position, I provide, as a part of the stationary frame, a locking rail 63, which is of angular section, as shown in Figs. 4 and 5, and in the closed position of the parts is adapted to have its forward portion overlap and lock the upper end $F^1$ of the sofa-back member F, thus holding the latter in the closed position and completely hiding all of the operative parts of the mechanism. The locking rail is preferably pivoted upon dowel-pins 64 fastened in the arm or side frame-members $A^1$, the said dowels being mounted in such a position with reference to the gravity axis of the locking rail 63 as to cause the latter to remain either in the closed or locking position shown in Figs. 4 and 5, or in the open position shown in Fig. 2, by gravity.

The rear ends of the side frame or arm-members $A^1$ are secured together by the frame $A^2$ shown in Fig. 12. In the manufacture of sofa-beds of the general type illustrated by my invention, it is customary to disassemble the parts for shipment, and with this in view, I have particularly constructed the several elements of my sofa-bed, with a view to permitting of their being readily disassembled and put together again. The back member $A^2$ is, for this reason, secured to the side-frames $A^1$ merely by the use of dowel-pins 70, which are adapted to enter corresponding bores in the overlapping ends of the longitudinal slats 71 of the frame $A^2$. The vertical end-piece 72 of the frame then lies against the inner face of the arm $A^1$ and is held in this position, and the dowel-pins thus held in engagement with the longitudinal slats 71 by means of a pivoted block or button 74, which may be turned to latch over the back frame $A^2$, in a well understood manner.

In order to operate a folding sofa-bed such as that described, a single movement only is necessary. Assuming that the parts are in the position shown in Fig. 4, that is, with the linkage occupying the position shown in Fig. 7, the locking rail 63 having first been tilted to release the upper end of the sofa back member F, the operator may grasp the upper or outer end of the bed-section D, which is substantially parallel and flush with the upper end of the sofa-back and may pull the same outwardly with a single movement, to the position shown in Fig. 2. During such movement the bed-section D swings about the pivotal axis 28, the sofa seat member G is, by its parallel linkage, carried forward and downward, and the sofa back member F is pulled inward away from the end of the bed-section D, and is permitted to drop below the latter. At the same time, and through the motion communicated from the sofa back member F, the folding foot-piece and legs are extended to their operative positions. In order to assist the operator in this unfolding movement, and also for the purpose of rendering the entire motion of the parts a balanced motion, in so far as possible, I provide a spring 80 on each of the linkages E. As shown in Figs. 2, 4, and 5, this spring has one end secured, as at 81, to the end-piece 32 of the storage-receptacle $A^3$, and has its other end connected to a small link 82, which is pivoted at 83 to the arm 27. It will be seen that in the unfolded position of the parts, as shown in Fig. 2, the tendency of the spring 80 is to swing the arm 27 to the closed position. The tendency of the spring in this position of the parts is, therefore, to assist the operator in lifting the outer end of the bed-section D, when it is desired to move the bed to the closed position. As this closing movement takes place, the link 82 swings in a clockwise direction about its pivot 83 until stopped by a lug 84, and upon further closing movement of the bed, the spring resists or opposes the swinging movement of the arm 27. During this further closing movement, however, when the spring is opposing the closing of the bed, the weight of the parts is assisting such closing movement. The effect of the spring, both in the closing and unclosing movements is, therefore, to oppose the weight of the parts; that is, to pull against gravity so that the action of the bed is balanced in so far as it is possible. In order to render the operation of the bed more convenient, I prefer to provide a handle 85 (see Fig. 17) which may be secured to the center of the foot-rail of the section D and may be of the bent form shown, in order that it will swing out of the way in the closed position of the parts.

The particular construction of the bed-sections A, B and C is immaterial to my present invention, and I do not wish to describe the same in detail, therefore. It need only be said that any desired form of spring fabric may be used in connection with the bed-frames. In the drawing I have illustrated an ordinary form of square mesh fabric, designated 90, and secured to the frame members in a well-known way by helical springs. The rear ends of the side rails of the bed-section D are shown as held in proper parallel relation against the pull of the spring fabric, by means of a well-known arched spacer, designated 91.

While I have shown and described in considerable detail one specific embodiment of my invention, it is to be understood that such showing and description is illustrative only and for the purpose of making my invention more clear, and that I do not regard my invention as limited to the details shown or described, nor to any of them, except in so far as such limitations have been included in the terms of the following claims, in which it is my intention to claim all novelty inherent in my invention as broadly as is possible, in view of the prior art.

What I claim as new and desire to secure by Letters Patent, is:

1. In a sofa-bed and in combination, a stationary frame, a rear bed-section supported in said frame near the back thereof, an intermediate bed-section connected with said rear bed-section, a front bed-section connected with said intermediate bed-section, a swinging arm mounted at one end in the frame and carrying the said front bed-section at its other end, a folding foot-piece pivoted at the outer end of said front bed-section to fold toward and away from the same, a second swinging arm mounted in the frame at one end, and connections between the second said arm and the said folding foot-piece, whereby the latter is moved toward the said bed-section in the folding movement of the latter and is opened out away from the said bed-section in the extending movement of the latter.

2. In a sofa bed and in combination, a stationary frame, a plurality of pivotally connected bed sections, one of said bed sections being mounted in the frame and another or outer of said sections being mounted and adapted to move out of the frame to constitute a bed bottom, a foot piece or bedding fastener pivoted to said last named section for movement toward and away from the latter in folding and unfolding the bed respectively, supporting legs turnably connected to the end cross-part or outer rail of said last named section, control links connected to and extending from said bedding fastener and legs respectively, and common operating means for said control links, said common means operating to release and extend said fastener and to extend said legs to operative or supporting position when said last mentioned section is swung outward, and to fold the said bedding fastener and legs into substantially parallel relation with the said outer section when the latter is moved to its folded or sofa position.

3. In a sofa-bed and in combination, a stationary frame, a rear bed-section supported within the said frame for movement therein, an intermediate bed-section pivotally connected with the forward end of said bed-section, a front or outer bed-section pivotally connected with the front end of said intermediate bed-section, a swinging arm mounted at one end in the said frame and carrying at its free end the rear end of the said front bed-section, a sofa back member carried at its upper end by the outer end of said outer bed-section, a second swinging arm mounted at one end in said frame and carrying at its other end the lower end of said sofa back member, a folding foot for supporting the outer end of said outer bed-section, and connections between the said foot and the said sofa back member whereby the former is actuated from the latter.

4. In a sofa-bed and in combination, a stationary frame, pivot members mounted at opposite ends in the said frame, a rear bed-section, slotted supporting plates fastened to and projecting upward from the rear part of said rear bed-section and having their slotted portions engaging over the said pivot-studs, an intermediate bed-section pivoted to said rear bed-section, a front bed-section pivoted to said intermediate bed-section, and a swinging arm mounted at one end in the said frame and carrying the said front bed-section at its other end, the rear part of said head bed-section being swingable on said plates downward below and rearward behind said pivots in unfolding and folding the device respectively.

5. In a sofa-bed and in combination, a stationary frame, a foldable bed-section mounted in said frame for movement into and out of the same, a foldable leg pivoted to swing on an axis parallel to the side-rail of the said bed-section, a reciprocating block slidable along the said side-rail, a reciprocating block slidable along the said foot-rail, a diagonal link joining the said blocks for transferring motion from one to the other, and means for operating the said leg from the said last-named block.

6. In a sofa-bed, and in combination, a stationary frame, an arm pivoted to swing in the frame, a bed-section carried by the arm, a lifting spring secured at one end of the frame at a position intermediate the arc of motion of the said swinging arm, a link-connection between the free end of the spring and the said arm and pivoted to the latter, and means for limiting the movement of the said link arranged and adapted to increase the spring tension as the device approaches near its folded position, substantially as and for the purpose described.

7. A sofa bed, comprising a stationary frame, a sofa seat member, a sofa back member, front and rear bottom sections lying in planes opposite one another and behind the said sofa back member when in folded condition, connecting means joining the said sections at their lower ends, a folding foot-piece connected to said front bed section at its outer end and when in folding condition closing the aperture between the upper ends of said front and rear bed bottom sections, connections between the frame and said sections which permit the latter to be separated at their upper ends and extend into a single horizontal plane and constitute a bed bottom, link means mounted and adapted for carrying the seat member downward in front of said frame in unfolding the device, said link means including a swinging support connected at one end to said seat member and at its other end pivoted to said frame, and connections extending from the swinging support for moving the said folding foot-piece to an upright position in said extending motion of the parts.

8. In a sofa-bed and in combination, a frame, a sofa back member, a sofa seat member, front and rear bed-bottom sections lying in planes opposite one another and behind the said sofa back member when in folded condition, means connecting the adjacent edges of said sections, a locking-rail pivoted to said frame on a line adjacent to but displaced somewhat back from and below its gravity axis and adapted to swing over the upper end of the said sofa back member to house the latter and to lock it in folded position, and connections between the frame and the said sections which permit the latter to be separated at their upper ends and extend into a single horizontal plane to constitute a bed-bottom.

9. In a sofa-bed and in combination, a frame, a sofa seat member, a pair of members extending beneath the said sofa seat member and rearwardly therefrom and having their rear ends bent upwardly, a swinging lever having one end secured in said frame and the other end rigidly attached to the upwardly extending end of one of said arms, and a second swinging lever pivoted to the said frame and having its outer end pivotally connected to the upwardly-extending end of the other of said arms, whereby the said levers constitute a parallel linkage for swinging the said sofa seat member from an operative position in the frame forwardly and downwardly to an inoperative position in front of the said frame.

10. A convertible seat and bed device, comprising a frame, a foldable sectional bed bottom mounted thereon including an inner section, an outer section, and connecting means joining the same, a back mounted slidably on said outer section, means for sliding said back inward automatically in unfolding the device and vice versa, a member mounted swingingly on the outer section and operative means on said outer section connected to said back and controlled by the movement thereof for swinging said member.

11. A convertible seat and bed device, comprising a main frame, a pair of links on each end thereof, a bed section carried swingingly by one of said links on each side, a back disposed adjacent to said section and having its upper part carried slidably thereby, and means connecting the lower part of said back to the other of said links on each side.

12. A convertible seat and bed device, comprising a main frame, a pair of links on each end thereof, a bed section carried swingingly by one of said links on each side, a back disposed adjacent to said section and having its upper part carried slidably thereby, a seat mounted swingingly on the first mentioned links, and link means connecting the lower part of said back to the other of said links on each side, said seat being connected to said other links and said means comprising a link on each side of the device.

LOUIS E. WEINMANN.

In presence of:—
O. C. AVISUS.
K. O'NEILL.